United States Patent
Umemoto et al.

(10) Patent No.: US 12,434,198 B2
(45) Date of Patent: Oct. 7, 2025

(54) GAS SEPARATION MEMBRANE MODULE

(71) Applicants: KAWASAKI JUKOGYO KABUSHIKI KAISHA, Kobe (JP); KURARAY, CO., LTD., Kurashiki (JP)

(72) Inventors: Katsuya Umemoto, Kobe (JP); Takafumi Ito, Kobe (JP); Koji Fukumoto, Kobe (JP); Tomoaki Umemura, Kobe (JP); Koji Miyake, Kurashiki (JP); Kazuhiko Eda, Kurashiki (JP); Youhei Yabuno, Kurashiki (JP); Kensaku Komatsu, Kurashiki (JP)

(73) Assignees: KAWASAKI JUKOGYO KABUSHIKI KAISHA, Kobe (JP); KURARAY CO., LTD., Kurashiki (JP)

( * ) Notice: Subject to any disclaimer, the term of this patent is extended or adjusted under 35 U.S.C. 154(b) by 267 days.

(21) Appl. No.: 17/766,375

(22) PCT Filed: Sep. 29, 2020

(86) PCT No.: PCT/JP2020/036842
§ 371 (c)(1),
(2) Date: Apr. 4, 2022

(87) PCT Pub. No.: WO2021/065889
PCT Pub. Date: Apr. 8, 2021

(65) Prior Publication Data
US 2024/0058764 A1  Feb. 22, 2024

(30) Foreign Application Priority Data
Oct. 3, 2019  (JP) .................. 2019-182775

(51) Int. Cl.
*B01D 53/02*  (2006.01)
*B01D 53/22*  (2006.01)
*B01D 63/04*  (2006.01)

(52) U.S. Cl.
CPC .......... *B01D 63/043* (2013.01); *B01D 53/22* (2013.01); *B01D 2053/224* (2013.01); *B01D 2313/10* (2013.01); *B01D 2313/12* (2013.01)

(58) Field of Classification Search
CPC .......... B01D 2053/224; B01D 2311/13; B01D 2313/08; B01D 2313/10; B01D 2313/12;
(Continued)

(56) References Cited

U.S. PATENT DOCUMENTS

2005/0000353 A1*  1/2005  Nemser ................. B01D 53/22
                                                                  95/50
2007/0246049 A1   10/2007  Takeda et al.
(Continued)

FOREIGN PATENT DOCUMENTS

JP   H02-111415 A   4/1990
JP   H07-178322 A   7/1995
(Continued)

OTHER PUBLICATIONS

Mar. 28, 2023 Search Report issued in Chinese Patent Application No. 2020800679730.

*Primary Examiner* — Christopher P Jones
(74) *Attorney, Agent, or Firm* — Oliff PLC

(57) ABSTRACT

A gas separation membrane module includes at least one hollow fiber membrane element and a casing. The hollow fiber membrane element includes hollow fiber membranes and a cylindrical body. The cylindrical body extends in a longitudinal direction of the hollow fiber membranes, and accommodates the hollow fiber membranes. The hollow fiber membrane element includes sweep gas introduction
(Continued)

ports and mixed gas discharge ports. A first supply chamber, a first discharge chamber, a second supply chamber, and a second discharge chamber are positioned between the casing and the hollow fiber membrane element. The first supply chamber, the first discharge chamber, the second supply chamber, and the second discharge chamber are partitioned off from each other.

11 Claims, 3 Drawing Sheets

(58) Field of Classification Search
CPC ............ B01D 2313/19; B01D 2313/20; B01D 2313/26; B01D 53/22; B01D 53/228; B01D 63/04; B01D 63/043; B01D 69/08
See application file for complete search history.

(56) References Cited

U.S. PATENT DOCUMENTS

| | | |
|---|---|---|
| 2008/0127821 A1 | 6/2008 | Noack et al. |
| 2009/0130495 A1 | 5/2009 | Terasaki et al. |
| 2016/0036075 A1 | 2/2016 | Kim et al. |
| 2020/0179867 A1 | 6/2020 | Koizumi et al. |

FOREIGN PATENT DOCUMENTS

| | | |
|---|---|---|
| JP | 2003-065566 A | 3/2003 |
| JP | 2006-512946 A | 4/2006 |
| JP | 2007-046801 A | 2/2007 |
| JP | 2007-207610 A | 8/2007 |
| JP | 4435557 B2 | 3/2010 |
| JP | 2012-130864 A | 7/2012 |
| JP | 2016-035895 A | 3/2016 |
| WO | 2018/221740 A1 | 12/2018 |

* cited by examiner

GAS SEPARATION MEMBRANE MODULE

CROSS-REFERENCE TO RELATED APPLICATIONS

This application is a National Stage Entry of International Application No. PCT/JP2020/036842 filed on Sep. 29, 2020, which claims priority to Japanese Patent Application No. 2019-182775 filed on Oct. 3, 2019, the contents of each of which are hereby incorporated by reference in their entirety.

TECHNICAL FIELD

The present disclosure relates to a gas separation membrane module for performing gas separation by using hollow fiber membranes.

BACKGROUND ART

In order to remove a particular component from gas, for example, a gas separation membrane module utilizing hollow fiber membranes is used. Patent Literature 1 discloses a gas separation membrane module including: hollow fiber membranes; and a cylindrical body that accommodates the hollow fiber membranes in such a manner that the hollow fiber membranes are arranged side by side.

During the use of the gas separation membrane module, feed gas is introduced into hollows of the respective hollow fiber membranes. Sweep gas is introduced into an internal space of the cylindrical body through a single introduction port. The introduction port is provided, on the outer periphery of the cylindrical body, at one end side of the cylindrical body in the longitudinal direction of the cylindrical body. The sweep gas removes a particular component from the feed gas via the hollow fiber membranes while flowing through the internal space of the cylindrical body. As a result, mixed gas is generated. The generated mixed gas is discharged from the internal space of the cylindrical body to outside through a single discharge port. The discharge port is provided, on the outer periphery of the cylindrical body, at the other end side of the cylindrical body in the longitudinal direction of the cylindrical body. The feed gas from which the particular component has been removed is, after passing through the hollows of the respective hollow fiber membranes, utilized for its intended purpose. For example, such a gas separation membrane module is used to remove carbon dioxide from indoor air to purify the air.

CITATION LIST

Patent Literature

PTL 1: Japanese Patent No. 4435557

SUMMARY OF INVENTION

Technical Problem

In the gas separation membrane module with the above-described configuration, when the sweep gas flows through the internal space of the cylindrical body, there is a case where the distribution of the sweep gas becomes non-uniform. As a result, for example, the sweep gas has a less chance to come into contact with the hollow fiber membranes that are more distant from the introduction port than the hollow fiber membranes positioned near the introduction port. Consequently, gas separation efficiency is lowered.

Such a problem occurs also in the aforementioned case where the gas separation membrane module is used for air purification.

In view of the above, an object of the present disclosure is to, in a case where a gas separation membrane module that accommodates hollow fiber membranes therein is used for air purification, prevent lowering of the gas separation efficiency of the gas separation membrane module.

Solution to Problem

In order to solve the above-described problems, a gas separation membrane module according to one aspect of the present disclosure includes: at least one hollow fiber membrane element including hollow fiber membranes and a cylindrical body, the hollow fiber membranes being arranged side by side, each hollow fiber membrane including a hollow through which feed gas flows, the cylindrical body extending in a longitudinal direction of the hollow fiber membranes and accommodating the hollow fiber membranes; and a casing that covers at least part of the cylindrical body in an air-tight manner. The hollow fiber membrane element includes: sweep gas introduction ports positioned on an outer periphery of the cylindrical body at one end side of the cylindrical body in a longitudinal direction of the cylindrical body, the sweep gas introduction ports being arranged dispersedly in a circumferential direction of the cylindrical body, the sweep gas introduction ports being introduction ports through which sweep gas having a lower carbon dioxide concentration and a higher oxygen concentration than the feed gas is introduced into an internal space of the cylindrical body, such that the sweep gas comes into contact with the hollow fiber membranes in the internal space; and mixed gas discharge ports positioned on the outer periphery of the cylindrical body at another end side of the cylindrical body in the longitudinal direction of the cylindrical body, the mixed gas discharge ports being arranged dispersedly in the circumferential direction of the cylindrical body, the mixed gas discharge ports being discharge ports through which mixed gas is discharged from the internal space, the mixed gas being generated as a result of the sweep gas coming into contact with the feed gas via the hollow fiber membranes in the internal space. A first supply chamber, a first discharge chamber, a second supply chamber, and a second discharge chamber are positioned between the casing and the hollow fiber membrane element. The first supply chamber communicates with each of the hollow fiber membranes, and is filled with the feed gas that is supplied from outside. The first discharge chamber communicates with each of the hollow fiber membranes, and is filled with purified air that is generated as a result of the feed gas coming into contact with the sweep gas in the hollows of the hollow fiber membranes via the hollow fiber membranes. The second supply chamber extends continuously in the circumferential direction of the cylindrical body, communicates with each of the sweep gas introduction ports, and is filled with the sweep gas that is supplied from outside. The second discharge chamber extends continuously in the circumferential direction of the cylindrical body, communicates with each of the mixed gas discharge ports, and is filled with the mixed gas that has passed through the internal space. The first supply chamber, the first discharge chamber, the second supply chamber, and the second discharge chamber are partitioned off from each other.

Advantageous Effects of Invention

The above aspect of the present disclosure makes it possible to, in a case where a gas separation membrane module that accommodates hollow fiber membranes therein is used for air purification, prevent lowering of the gas separation efficiency of the gas separation membrane module.

DESCRIPTION OF EMBODIMENTS

Hereinafter, embodiments of the present disclosure are described with reference to the drawings.

Embodiment 1

Figure 1:
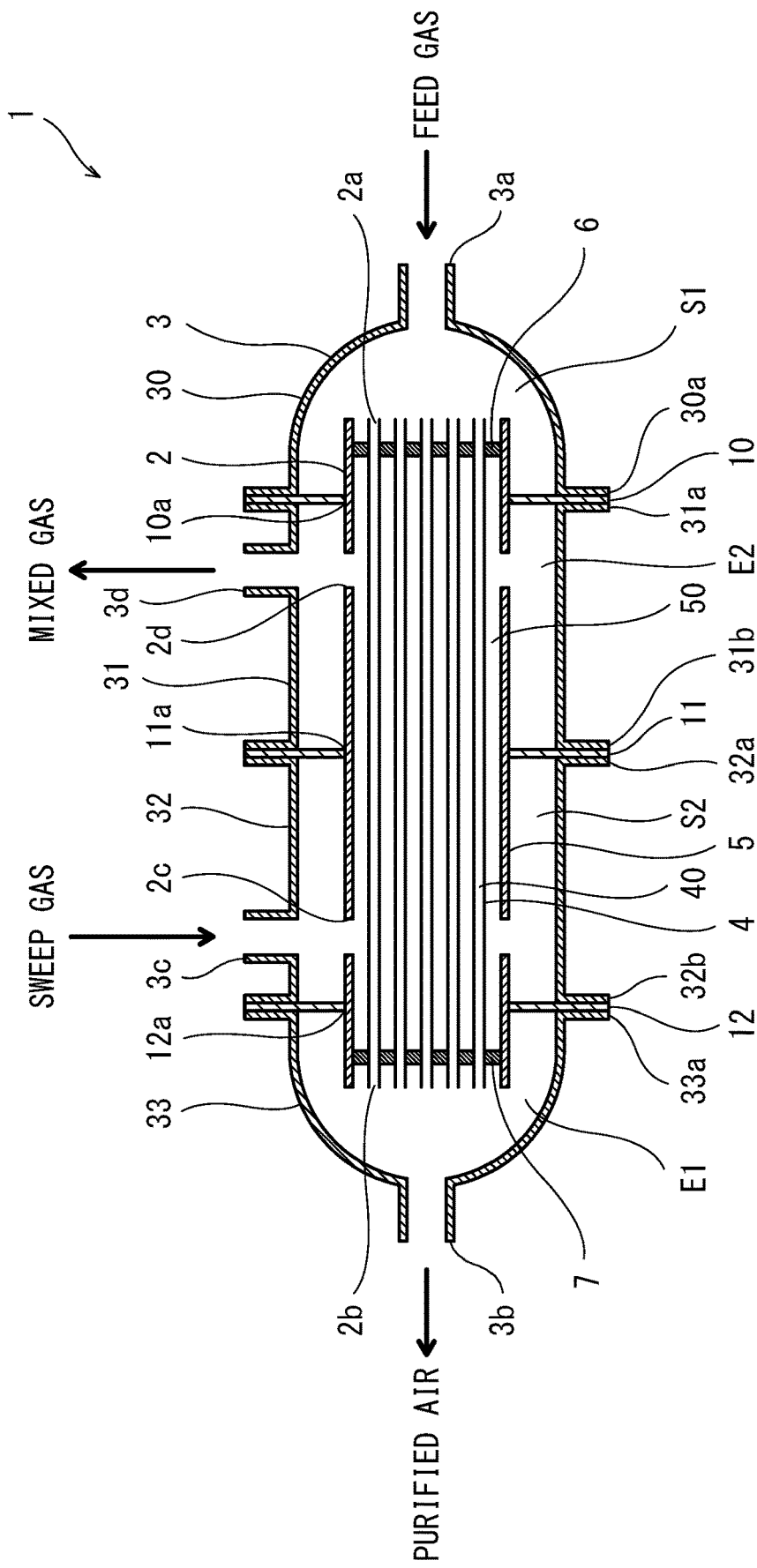
FIG. 1 is a sectional view of a gas separation membrane module according to Embodiment 1.

FIG. 1 is a sectional view of a gas separation membrane module 1 according to Embodiment 1 of the present disclosure. The gas separation membrane module 1 purifies air in a room. In the description herein, the room is a person's residential space or any other space equivalent thereto. The room is a space that needs air conditioning.

For example, the room may be a room in a building, such as an office building. Alternatively, the room may be a room in a transportation system, such as a railcar or an aircraft (i.e., a cabin). The room may be a room in, for example, a space station, a submersible ship, or a disaster refuge facility. The room may be, for example, a room that is not accessed by humans and in which animals and/or plants are managed and the carbon dioxide concentration is controlled and kept to a certain level or lower.

As shown in FIG. 1, the gas separation membrane module 1 includes at least one hollow fiber membrane element 2 and a casing 3. The hollow fiber membrane element 2 includes hollow fiber membranes 4 and a cylindrical body 5. Each of the hollow fiber membranes 4 includes a hollow 40, through which feed gas flows, and the hollow fiber membranes 4 are arranged side by side. The cylindrical body 5 includes an internal space 50, which accommodates the hollow fiber membranes 4. Owing to a carbon dioxide partial pressure difference between the feed gas and sweep gas, the hollow fiber membranes 4 remove carbon dioxide from the feed gas, and supply oxygen to the feed gas. In this manner, the feed gas is purified.

The cylindrical body 5 extends in the longitudinal direction of the hollow fiber membranes 4. As one example, the cylindrical body 5 has a circular cylindrical shape. The internal space 50 of the cylindrical body 5 accommodates, as one example, several tens to several hundreds of the hollow fiber membranes 4. At both ends of the cylindrical body 5 in the longitudinal direction thereof, end portions of each hollow fiber membrane 4 are exposed. In this state, the inside of the cylindrical body 5 is sealed by, for example, resin walls 6 and 7. The resin walls 6 and 7 are, for example, epoxy resin walls. Alternatively, the cylindrical body 5 may have, for example, a rectangular tubular shape or a polygonal tubular shape.

Specifically, the hollow fiber membrane element 2 includes feed gas introduction ports 2a, purified air discharge ports 2b, sweep gas introduction ports 2c, and mixed gas discharge ports 2d. The feed gas introduction ports 2a and the purified air discharge ports 2b are end openings of the hollow fiber membranes 4. The purified air discharge ports 2b are positioned at one end of the cylindrical body 5 in the longitudinal direction thereof. Purified air is generated as a result of the feed gas in the hollows 40 of the hollow fiber membranes 4 coming into contact with the sweep gas via the hollow fiber membranes 4. The purified air is discharged through the purified air discharge ports 2b. The purified air is air that has a lower carbon dioxide concentration and a higher oxygen concentration than the feed gas. The feed gas introduction ports 2a are positioned at the other end of the cylindrical body 5 in the longitudinal direction thereof, and the feed gas is introduced into the hollows 40 of the hollow fiber membranes 4 through the feed gas introduction ports 2a.

The sweep gas introduction ports 2c are positioned on the outer periphery of the cylindrical body 5 at one end side of the cylindrical body 5 in the longitudinal direction of the cylindrical body 5, and are arranged dispersedly in the circumferential direction of the cylindrical body 5. The sweep gas, which has a lower carbon dioxide concentration and a higher oxygen concentration than the feed gas, is introduced into the internal space 50 through the sweep gas introduction ports 2c, such that the sweep gas comes into contact with the hollow fiber membranes 4 in the internal space 50. The mixed gas discharge ports 2d are positioned on the outer periphery of the cylindrical body 5 at the other end side of the cylindrical body 5 in the longitudinal direction of the cylindrical body 5, and are arranged dispersedly in the circumferential direction of the cylindrical body. Mixed gas is generated as a result of the sweep gas in the internal space 50 coming into contact with the feed gas via the hollow fiber membranes 4. The mixed gas is discharged from the internal space 50 through the mixed gas discharge ports 2d.

As one example, the sweep gas introduction ports 2c and the mixed gas discharge ports 2d are both arranged at regular intervals in the circumferential direction of the cylindrical body 5. The outer peripheral surface of the cylindrical body 5, except its regions where the sweep gas introduction ports 2c and the mixed gas discharge ports 2d are positioned, has a flat surface. In the hollow fiber membrane element 2 of the present embodiment, the total opening area of the sweep gas introduction ports 2c and the total opening area of the mixed gas discharge ports 2d are both set to be equal to the total cross-sectional area of the hollow fiber membranes 4. The total cross-sectional area of the hollow fiber membranes 4 is measured based on the internal diameters of the respective hollow fiber membranes 4. In this example, the hollow fiber membrane element 2 includes eight sweep gas introduction ports 2c and eight mixed gas discharge ports 2d. In the hollow fiber membrane element 2, the gas in the hollows 40 of the hollow fiber membranes 4 and the gas in the internal space 50 of the cylindrical body 5 flow opposite each other in the longitudinal direction of the cylindrical body 5.

As one example, the internal diameter of each hollow fiber membrane 4 is set to a value within a range of greater than or equal to 500 μm and less than or equal to 5000 μm. More preferably, the value of the internal diameter of each hollow fiber membrane 4 is within a range of greater than or equal to 500 μm and less than or equal to 3000 μm. Most preferably, the value of the internal diameter of each hollow fiber membrane 4 is within a range of greater than or equal to 1000 μm and less than or equal to 3000 μm.

As one example, the external diameter of each hollow fiber membrane 4 is set to a value within a range of greater than or equal to 700 μm and less than or equal to 5200 More preferably, the value of the external diameter of each hollow fiber membrane 4 is within a range of greater than or equal to 700 μm and less than or equal to 3200 Most preferably, the value of the external diameter of each hollow fiber membrane 4 is within a range of greater than or equal to 1200 μm and less than or equal to 3200 μm.

As one example, the membrane thickness of each hollow fiber membrane 4 is set to a value within a range of greater than or equal to 30 μm and less than or equal to 500 More preferably, the value of the membrane thickness of each hollow fiber membrane 4 is within a range of greater than or equal to 30 μm and less than or equal to 300 Most preferably, the value of the membrane thickness of each hollow fiber membrane 4 is within a range of greater than or equal to 50 μm and less than or equal to 300 In order for each hollow fiber membrane 4 to properly exert its gas separation performance, it is desirable that the hollow fiber membranes 4 be arranged at regular intervals in the hollow fiber membrane element 2. For the purpose of arranging the hollow fiber membranes 4 in such a manner, the hollow fiber membranes 4 may be, for example, crimped.

The raw material of each hollow fiber membrane 4 is not particularly limited, so long as the hollow fiber membrane 4 can be made of the raw material. For example, the raw material of the hollow fiber membrane 4 contains at least one of the following components: acrylic resin, polyacrylonitrile, polystyrene, polyamide, polyacetal, polycarbonate, polyphenylene ether, polyphenylene sulfide, polyethylene terephthalate, polytetrafluoroethylene, polyvinylidene fluoride, polyether imide, polyamide-imide, polychloroethylene, polyethylene, polypropylene, polyketone, crystalline cellulose, polysulfone, polyphenylsulfone, polyethersulfone, acrylonitrile butadiene styrene (ABS) resin, and acrylonitrile styrene (AS) resin. Among these, for example, polysulfone is preferable since it is excellent in terms of processability and pressure-resistant performance.

As one example, in the hollow fiber membrane element 2, a ratio A2/A1, which is the ratio of a total cross-sectional area A2 of the hollow fiber membranes 4 to an internal cross-sectional area A1 of the cylindrical body 5, is set to a value within a range of greater than or equal to 0.4. The internal cross-sectional area A1 is perpendicular to the longitudinal direction of the cylindrical body 5, and the total cross-sectional area A2 is perpendicular to the longitudinal direction of the hollow fiber membranes 4. The ratio A2/A1 is, in other words, the filling rate of the hollow fiber membranes 4 in the cylindrical body 5. By thus setting the ratio A2/A1, for example, high gas separation performance is readily obtained while maintaining the gas permeability of the hollow fiber membranes 4. The ratio A2/A1 is not limited to the above value.

The casing 3 covers at least part of the cylindrical body 5 in an air-tight manner. The casing 3 includes a first introduction port 3a, a first discharge port 3b, a second introduction port 3c, and a second discharge port 3d. A first supply chamber S1, a first discharge chamber E1, a second supply chamber S2, and a second discharge chamber E2 are positioned between the casing 3 and the hollow fiber membrane element 2.

The first supply chamber S1 communicates with the hollow fiber membranes 4 via the respective feed gas introduction ports 2a. The first supply chamber S1 is filled with the feed gas that is supplied from outside. Desirably, the volume of the first supply chamber S1 is relatively great so as to suppress a turbulent flow of the feed gas supplied into the first supply chamber S1 and to allow the feed gas to be readily introduced into each of the feed gas introduction ports 2a. The first discharge chamber E1 communicates with the hollow fiber membranes 4 via the respective purified air discharge ports 2b. The first discharge chamber E1 is filled with the purified air that has passed through the hollows 40 of the hollow fiber membranes 4.

The second supply chamber S2 communicates with the sweep gas introduction ports 2c, and is filled with the sweep gas that is supplied from outside. The second supply chamber S2 extends continuously in the circumferential direction of the cylindrical body 5. The second discharge chamber E2 communicates with the mixed gas discharge ports 2d, and is filled with the mixed gas that has passed through the internal space 50. The second discharge chamber E2 extends continuously in the circumferential direction of the cylindrical body 5. In the present embodiment, the volume of one of, or each of, the second supply chamber S2 and the second discharge chamber E2 (in this example, the volume of each of the chambers S2 and E2) is set to a value that is 1.0 times or more as great as the volume of the hollow fiber membrane element 2.

Through the first introduction port 3a, the feed gas is introduced into the first supply chamber S1 from outside. Through the first discharge port 3b, the purified air in the first discharge chamber E1 is discharged to outside. Through the second introduction port 3c, the sweep gas is introduced into the second supply chamber S2 from outside. Through the second discharge port 3d, the purified air in the second discharge chamber E2 is discharged to outside.

The casing 3 of the present embodiment includes a first inner wall 10, a second inner wall 11, and a third inner wall 12. The first inner wall 10 partitions off the first supply chamber S1 and the second discharge chamber E2 from each other in the longitudinal direction of the cylindrical body 5, and supports the hollow fiber membrane element 2. The second inner wall 11 partitions off the second discharge chamber E2 and the second supply chamber S2 from each other in the longitudinal direction of the cylindrical body 5, and supports the hollow fiber membrane element 2. The third inner wall 12 partitions off the second supply chamber S2 and the first discharge chamber E1 from each other in the longitudinal direction of the cylindrical body 5, and supports the hollow fiber membrane element 2. The casing 3 accommodates the entire hollow fiber membrane element 2. As one example, each of the first inner wall 10, the second inner wall 11, and the third inner wall 12 is a partition plate.

The casing 3 of the present embodiment includes a first structure 30, a second structure 31, a third structure 32, and a fourth structure 33. The first structure 30, the second structure 31, the third structure 32, and the fourth structure 33 are arranged sequentially in the longitudinal direction of the casing 3. The first structure 30 includes a flange 30a on its side adjacent to the second structure 31. The second structure 31 includes a flange 31a on its side adjacent to the first structure 30, and includes a flange 31b on its side adjacent to the third structure 32. The third structure 32 includes a flange 32a on its side adjacent to the second structure 31, and includes a flange 32b on its side adjacent to the fourth structure 33. The fourth structure 33 includes a flange 33a on its side adjacent to the third structure 32.

The flanges 30a and 31a are detachably fastened together by a fastener, with the first inner wall 10 interposed between the flanges 30a and 31a. The flanges 31b and 32a are detachably fastened together by a fastener, with the second inner wall 11 interposed between the flanges 31b and 32a. The flanges 32b and 33a are detachably fastened together by a fastener, with the third inner wall 12 interposed between the flanges 32b and 33a. A sealer, such as a gasket, may be disposed between each inner wall and the flanges.

The inner walls 10, 11, and 12 include insertion holes 10a, 11a, and 12a, respectively. The insertion holes 10a, 11a, and 12a allow the hollow fiber membrane element 2 to be inserted therethrough. The hollow fiber membrane element 2 is detachably inserted through the insertion holes 10a, 11a, and 12a. Consequently, the inner walls 10, 11, and 12, which are arranged to be spaced apart from each other in the longitudinal direction of the casing 3, support the hollow fiber membrane element 2. Unshown sealers seal between the hollow fiber membrane element 2 and inner peripheral edges of the respective insertion holes 10a, 11a, and 12a in an air-tight manner.

In the gas separation membrane module 1, the hollow fiber membrane element 2 can be detached from the casing 3 by removing the fastener fastening the flanges 30a and 31a, the fastener fastening the flanges 31b and 32a, and the fastener fastening the flanges 32b and 33a from these flanges, and pulling the hollow fiber membrane element 2 out of the insertion holes 10a, 11a, and 12a. Thus, in the gas separation membrane module 1, the hollow fiber membrane element 2 is detachably mounted to the casing 3.

In the gas separation membrane module 1 of the present embodiment, a gas pressure difference $(P_1-P_2)$ between a gas pressure $P_1$ of the first supply chamber S1 and a gas pressure $P_2$ of each of the feed gas introduction ports 2a during the gas separation membrane module 1 being driven is set to be less than a gas pressure difference $(P_2-P_3)$ between the gas pressure $P_2$ of each of the feed gas introduction ports 2a and a gas pressure $P_3$ of each of the purified air discharge ports 2b during the gas separation membrane module 1 being driven. Accordingly, in the gas separation membrane module 1, the feed gas that is supplied to the first supply chamber S1 spreads and fills the entire first supply chamber S1 to increase the gas pressure before being introduced into the feed gas introduction ports 2a. Thereafter, the feed gas is uniformly introduced into each of the feed gas introduction ports 2a.

Also, in the gas separation membrane module 1, a gas pressure difference $(P_{11}-P_{12})$ between a gas pressure $P_{11}$ of the second supply chamber S2 and a gas pressure $P_{12}$ of each of the sweep gas introduction ports 2c during the gas separation membrane module 1 being driven is set to be less than a gas pressure difference $(P_{12}-P_{13})$ between the gas pressure $P_{12}$ of each of the sweep gas introduction ports 2c and a gas pressure $P_{13}$ of each of the mixed gas discharge ports 2d during the gas separation membrane module 1 being driven. Accordingly, in the gas separation membrane module 1, at the time of discharging of the feed gas from the internal space 50 of the cylindrical body 5 to the second discharge chamber E2 through the mixed gas discharge ports 2d, the feed gas is discharged, with great force, through the mixed gas discharge ports 2d into the second discharge chamber E2. This prevents non-uniform distribution of the feed gas in the internal space 50 of the cylindrical body 5. The gas pressure difference $(P_1-P_2)$ and the gas pressure difference $(P_{11}-P_{12})$ can be adjusted by adjusting, for example, the opening diameter of each of the ports 2c and 2d, the number of ports 2c and 2d, the internal diameter and the length of each of the hollow fiber membranes 4, and the filling rate of the hollow fiber membranes 4.

During the gas separation membrane module 1 being driven, the sweep gas is introduced from outside into the gas separation membrane module 1 through the second introduction port 3c. At the time, the sweep gas fills the second supply chamber S2 in a manner to disperse in the circumferential direction of the cylindrical body 5. Thereafter, the sweep gas is introduced into the internal space 50 of the cylindrical body 5 through the sweep gas introduction ports 2c.

At the time, the sweep gas that has dispersed inside the second supply chamber S2 is introduced into the internal space 50 through the sweep gas introduction ports 2c, which are dispersedly arranged in the circumferential direction of the cylindrical body 5. This prevents non-uniform distribution of the sweep gas in the internal space 50. Consequently, the sweep gas comes into uniform contact with the hollow fiber membranes 4, which are arranged in the internal space 50 of the cylindrical body 5. While the sweep gas is flowing in the internal space 50 in the longitudinal direction of the cylindrical body 5, carbon dioxide is transferred from the feed gas within the hollow fiber membranes 4 to the sweep gas, and thereby mixed gas is generated. The generated mixed gas is discharged into the second discharge chamber E2 through the mixed gas discharge ports 2d. Also at the time of discharging of the mixed gas, the mixed gas is discharged, in a dispersed manner, into the second discharge chamber E2 through the mixed gas discharge ports 2d, which are dispersedly arranged in the circumferential direction of the cylindrical body 5. This prevents non-uniform distribution of the mixed gas flowing in the internal space 50 of the cylindrical body 5. The mixed gas discharged into the second discharge chamber E2 is discharged to outside through the second discharge port 3d.

The feed gas is introduced from the inside of the room into the gas separation membrane module 1 through the first introduction port 3a. First, the feed gas fills the first supply chamber S1. Then, the feed gas is introduced into the hollows 40 of the hollow fiber membranes 4 of the hollow fiber membrane element 2 through the feed gas introduction ports 2a. While the feed gas is flowing through the hollows 40 in the longitudinal direction of the hollow fiber membranes 4, the feed gas comes into contact with the hollow fiber membranes 4. As a result, carbon dioxide is removed from the feed gas by the sweep gas that flows outside the hollow fiber membranes 4, and the feed gas is supplied with oxygen from the sweep gas.

At the time, the hollow fiber membranes 4 come into uniform contact with the sweep gas in the internal space 50 of the cylindrical body 5, and consequently, purified air is uniformly generated in the hollow fiber membranes 4. The generated purified air is discharged into the first discharge chamber E1 through the purified air discharge ports 2b. The purified air fills the first discharge chamber E1, and is then returned into the room through the first discharge port 3b. In this manner, the carbon dioxide concentration in the room is adjusted to 1,000 ppm or lower, which is an indoor environment standard.

As described above, according to the gas separation membrane module 1, the sweep gas that has filled the second supply chamber S2 is introduced into the internal space 50 of the cylindrical body 5 of the hollow fiber membrane element 2 through the sweep gas introduction ports 2c, which are positioned on the outer periphery of the cylindrical body 5 at one end side of the cylindrical body 5 in the longitudinal direction of the cylindrical body 5 and are arranged dispersedly in the circumferential direction of the cylindrical body 5. The mixed gas is discharged from the internal space 50 through the mixed gas discharge ports 2d, which are positioned on the outer periphery of the cylindrical body 5 of the hollow fiber membrane element 2 at the other end side of the cylindrical body 5 in the longitudinal direction of the cylindrical body 5 and are arranged dispersedly in the circumferential direction of the cylindrical body 5. In this manner, the sweep gas can be caused to flow in the internal space 50 of the cylindrical body 5 in a dispersed manner, which makes it possible to prevent non-uniform gas distribution when the sweep gas flows in the internal space 50 of the cylindrical body 5. Therefore, the sweep gas can be caused to come into uniform contact with the hollow fiber membranes 4, which are arranged in the internal space 50 of the cylindrical body 5. Consequently, carbon dioxide can be removed from the feed gas, and purified air can be generated efficiently.

The first supply chamber S1, the first discharge chamber E1, the second supply chamber S2, and the second discharge chamber E2 are partitioned off from each other. Therefore, for example, the purified air can be prevented from being mixed with other gas. This makes it possible to effectively improve the gas separation efficiency of the gas separation membrane module 1.

The hollow fiber membrane element 2 further includes: the feed gas introduction ports 2a, which are positioned at the other end of the cylindrical body 5 in the longitudinal direction and through which the feed gas is introduced into the hollow fiber membranes 4; and the purified air discharge ports 2b, which are positioned at the one end of the cylindrical body 5 in the longitudinal direction and through which the purified air that has passed through the hollows 40 of the hollow fiber membranes 4 is discharged. According to this configuration, the feed gas can be uniformly introduced into the hollows 40 of the hollow fiber membranes 4 of the hollow fiber membrane element 2. Therefore, the purified air can be generated efficiently.

In the gas separation membrane module 1, the gas pressure difference ($P_1$–$P_2$) between the gas pressure $P_1$ of the first supply chamber S1 and the gas pressure $P_2$ of each of the feed gas introduction ports 2a during the gas separation membrane module 1 being driven is set to be less than the gas pressure difference ($P_2$–$P_3$) between the gas pressure $P_2$ of each of the feed gas introduction ports 2a and the gas pressure $P_3$ of each of the purified air discharge ports 2b during the gas separation membrane module 1 being driven. According to this configuration, the feed gas and the purified air can be caused to flow uniformly within the hollow fiber membranes 4 from the feed gas introduction ports 2a toward the purified air discharge ports 2b, and the gas separation efficiency of the gas separation membrane module 1 can be improved.

Also, in the gas separation membrane module 1, the gas pressure difference ($P_{11}$–$P_{12}$) between the gas pressure $P_{11}$ of the second supply chamber S2 and the gas pressure $P_{12}$ of each of the sweep gas introduction ports 2c during the gas separation membrane module 1 being driven is set to be less than the gas pressure difference ($P_{12}$–$P_{13}$) between the gas pressure $P_{12}$ of each of the sweep gas introduction ports 2c and the gas pressure $P_{13}$ of each of the mixed gas discharge ports 2d during the gas separation membrane module 1 being driven. According to this configuration, the sweep gas and the mixed gas can be caused to flow favorably from the sweep gas introduction ports 2c toward the mixed gas discharge ports 2d while preventing non-uniform gas distribution in the internal space 50 of the cylindrical body 5, and the gas separation efficiency of the gas separation membrane module 1 can be improved.

Further, in the gas separation membrane module 1, the sweep gas introduction ports 2c and the mixed gas discharge ports 2d are both arranged at regular intervals in the circumferential direction of the cylindrical body 5. According to this configuration, the uniformity of the distribution of the sweep gas that flows in the internal space 50 of the cylindrical body 5 can be further improved, and thereby the gas separation efficiency of the gas separation membrane module 1 can be improved.

The casing 3 includes the inner walls 10 to 12, and accommodates the entire hollow fiber membrane element 2. According to this configuration, the entire hollow fiber membrane element 2 can be accommodated inside the single casing 3, and also, the first supply chamber S1, the second discharge chamber E2, the second supply chamber S2, and the second discharge chamber E2 can be partitioned off from each other and suitably arranged inside the single casing 3 with a relatively simple configuration.

In the gas separation membrane module 1, the volume of one of, or each of, the second supply chamber S2 and the second discharge chamber E2 is set to a value that is 1.0 times or more as great as the volume of the hollow fiber membrane element 2. According to this configuration, the sweep gas can be supplied into the internal space 50 of the cylindrical body 5 uniformly to further improve the uniformity of the distribution of the sweep gas in the internal space 50, and thereby the gas separation efficiency of the gas separation membrane module 1 can be further improved.

The internal diameter of each hollow fiber membrane 4 is set to a value within a range of greater than or equal to 500 μm and less than or equal to 5000 The external diameter of each hollow fiber membrane 4 is set to a value within a range of greater than or equal to 700 μm and less than or equal to 5200 The membrane thickness of each hollow fiber membrane 4 is set to a value within a range of greater than or equal to 30 μm and less than or equal to 500 According to this configuration, a gas component contained in each of the feed gas and the sweep gas (in the present embodiment, the gas component is carbon dioxide) is caused to permeate through the hollow fiber membrane 4 by utilizing the partial pressure difference of the gas component between the feed gas and the sweep gas. In this manner, gas separation can be performed efficiently.

In the gas separation membrane module 1, the hollow fiber membrane element 2 is detachably mounted to the casing 3. According to this configuration, maintenance can be relatively easily performed on the hollow fiber membrane element 2 in the casing 3, and high gas separation efficiency of the gas separation membrane module 1 can be maintained for a long period of time. Hereinafter, other embodiments are described focusing on differences from Embodiment 1.

Embodiment 2

Figure 2:
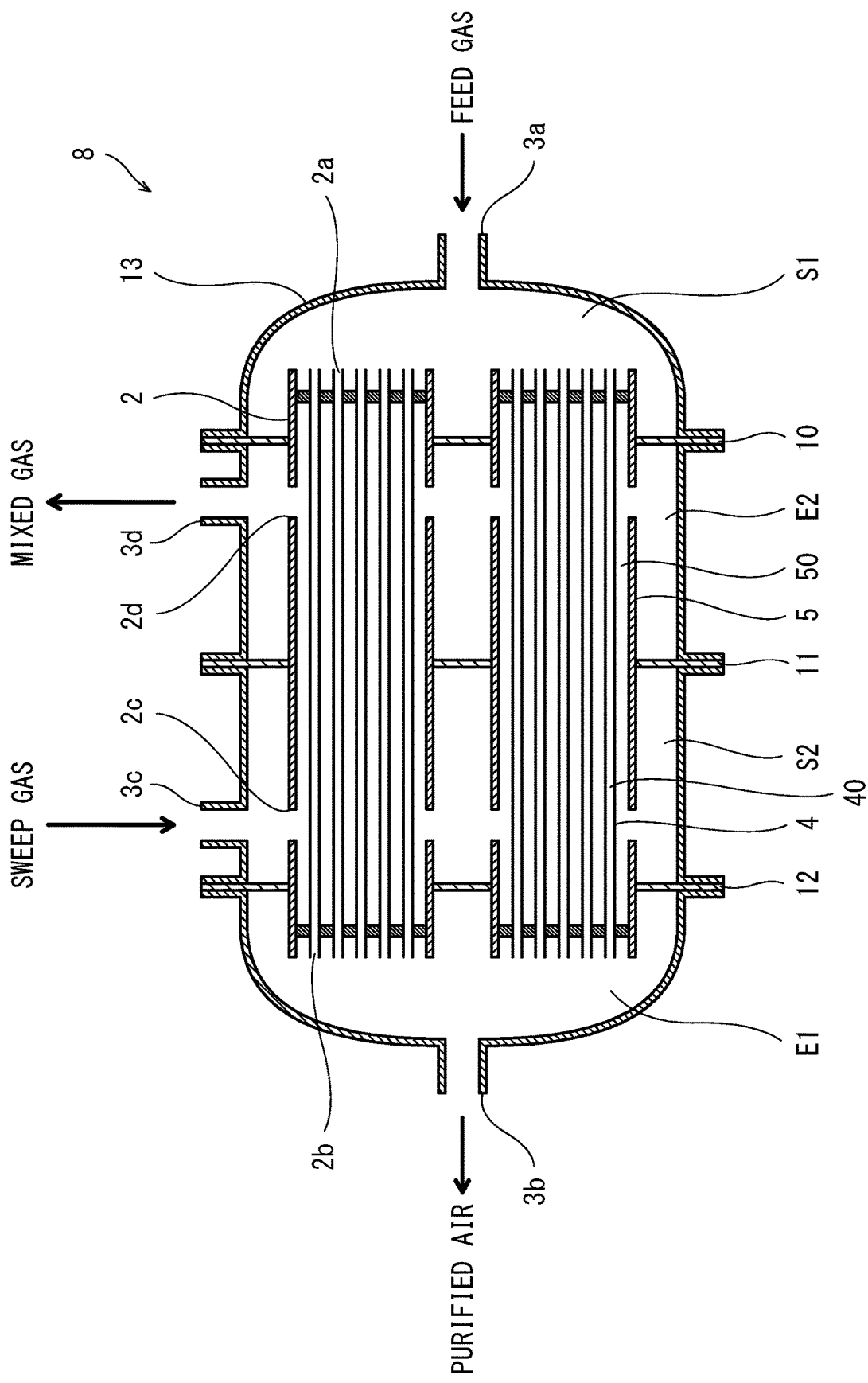
FIG. 2 is a sectional view of a gas separation membrane module according to Embodiment 2.

FIG. 2 is a sectional view of a gas separation membrane module 8 according to Embodiment 2. As shown in FIG. 2, in the gas separation membrane module 8, hollow fiber membrane elements 2 are arranged side by side and mounted to the same casing 13. As one example, the hollow fiber membrane elements 2 are arranged at regular intervals. However, this is merely a non-limiting example. In the present embodiment, the number of hollow fiber membrane elements 2 is two or more. According to this configuration, although this configuration is simple, excellent gas separation efficiency of the gas separation membrane module 8 can be achieved by using the hollow fiber membrane elements 2. In addition, the gas separation efficiency of the gas separation membrane module 8 can be readily adjusted by changing the number of hollow fiber membrane elements 2.

Embodiment 3

Figure 3:
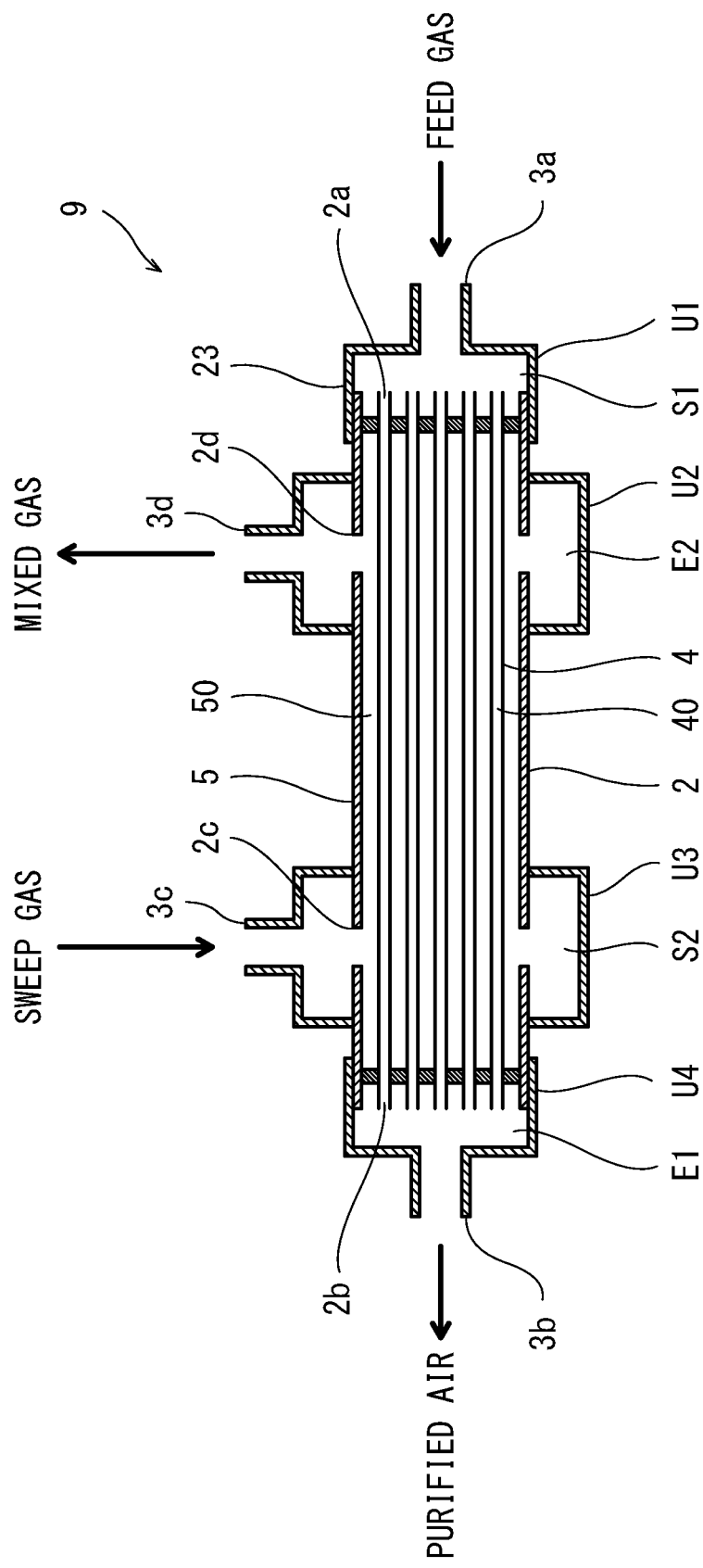
FIG. 3 is a sectional view of a gas separation membrane module according to Embodiment 3.

FIG. 3 is a sectional view of a gas separation membrane module 9 according to Embodiment 3. As shown in FIG. 3, the gas separation membrane module 9 includes a casing 23. The casing 23 includes multiple units (as one example, a first unit U1, a second unit U2, a third unit U3, and a fourth unit U4) that are arranged to be spaced apart from each other.

The first supply chamber S1 is positioned within the first unit U1. The first unit U1 includes the first introduction port 3a. The first unit U1 is disposed in a manner to cover the aforementioned other end of the cylindrical body 5 in the longitudinal direction. The second discharge chamber E2 is positioned within the second unit U2. The second unit U2 includes the second discharge port 3d. The second supply chamber S2 is positioned within the third unit U3. The third unit U3 includes the second introduction port 3c. Each of the second and third units U2 and U3 is disposed in a manner to cover the outer peripheral surface of the cylindrical body 5 over the entire circumference of the cylindrical body 5. The first discharge chamber E1 is positioned within the fourth unit U4. The fourth unit U4 includes the first discharge port 3b. The fourth unit U4 is disposed in a manner to cover the aforementioned one end of the cylindrical body 5 in the longitudinal direction.

The units U1 to U4 are mounted to the outer surface of the cylindrical body 5 of the single hollow fiber membrane element 2 in an air-tight manner. With the units U1 to U4, the casing 23 covers at least part of the cylindrical body 5 in an air-tight manner.

The gas separation membrane module 9 with the above-described configuration has the same advantageous effects as those of the gas separation membrane module 1 of Embodiment 1. Since the casing 23 includes the individual units U1 to U4, maintenance can be readily performed on each of the units U1 to U4 individually.

The present disclosure is not limited to the above-described embodiments. Modifications, additions, and/or deletions can be made to the above-described configurations without departing from the scope of the present disclosure. The above-described embodiments may be combined with each other in any manner. For example, part of a configuration or method described in one embodiment may be applied to another embodiment. The number of sweep gas introduction ports 2c and the number of mixed gas discharge ports 2d are not particularly limited, so long as the number of sweep gas introduction ports 2c and the number of mixed gas discharge ports 2d are both more than one. For example, both the number of sweep gas introduction ports 2c and the number of mixed gas discharge ports 2d may be two.

S1 first supply chamber
S2 second supply chamber
E1 first discharge chamber
E2 second discharge chamber
1, 8, 9 gas separation membrane module
2 hollow fiber membrane element
2a feed gas introduction port
2b purified air discharge port
2c sweep gas introduction port
2d mixed gas discharge port
3, 13, 23 casing
4 hollow fiber membrane
5 cylindrical body
10 first inner wall
11 second inner wall
12 third inner wall
50 internal space of the cylindrical body

The invention claimed is:

1. A gas separation membrane module comprising:
at least one hollow fiber membrane element including hollow fiber membranes and a cylindrical body, the hollow fiber membranes being arranged side by side, each hollow fiber membrane including a hollow through which feed gas flows, the cylindrical body extending in a longitudinal direction of the hollow fiber membranes and accommodating the hollow fiber membranes; and a casing that covers at least part of the cylindrical body in an air-tight manner, wherein the hollow fiber membrane element includes:
sweep gas introduction ports positioned on an outer periphery of the cylindrical body at one end side of the cylindrical body in a longitudinal direction of the cylindrical body, the sweep gas introduction ports being arranged dispersedly in a circumferential direction of the cylindrical body, the sweep gas introduction ports being introduction ports through which sweep gas having a lower carbon dioxide concentration and a higher oxygen concentration than the feed gas is introduced into an internal space of the cylindrical body, such that the sweep gas comes into contact with the hollow fiber membranes in the internal space; and mixed gas discharge ports positioned on the outer periphery of the cylindrical body at another end side of the cylindrical body in the longitudinal direction of the cylindrical body, the mixed gas discharge ports being arranged dispersedly in the circumferential direction of the cylindrical body, the mixed gas discharge ports being discharge ports through which mixed gas is discharged from the internal space, the mixed gas being generated as a result of the sweep gas coming into contact with the feed gas via the hollow fiber membranes in the internal space, the casing includes a casing-side introduction port through which the sweep gas is introduced into the casing, the casing-side introduction port being located on a peripheral surface of the casing such that the casing-side introduction port overlaps one of the sweep gas introduction ports in a radial direction of the cylindrical body, a first supply chamber, a first discharge chamber, a second supply chamber, and a second discharge chamber are positioned between the casing and the hollow fiber membrane element, the first supply chamber communicates with each of the hollow fiber membranes and is filled with the feed gas that is supplied from outside, the first discharge chamber communicates with each of the hollow fiber membranes and is filled with purified air that is generated as a result of the feed gas coming into contact with the sweep gas in the hollows of the hollow fiber membranes via the hollow fiber membranes, the second supply chamber extends continuously in the circumferential direction of the cylindrical body, communicates with each of the sweep gas introduction ports, and is filled with the sweep gas that is supplied from outside through the casing-side introduction port, the second discharge chamber extends continuously in the circumferential direction of the cylindrical body, communicates with each of the mixed gas discharge ports, and is filled with the mixed gas that has passed through the internal space, the first supply chamber, the first discharge chamber, the second supply chamber, and the second discharge chamber are partitioned off from each other, and when the gas separation membrane module is driven, (i) a first gas pressure difference between a gas pressure of the second supply chamber and a gas pressure of each of the sweep gas introduction ports is less than (ii) a second gas pressure difference between the gas pressure of each of the sweep gas introduction ports and a gas pressure of each of the mixed gas discharge ports.

2. The gas separation membrane module according to claim 1, wherein
the hollow fiber membrane element further includes:
feed gas introduction ports that are positioned at the other end of the cylindrical body in the longitudinal direction and through which the feed gas is introduced into the hollows of the hollow fiber membranes; and
purified air discharge ports that are positioned at the one end of the cylindrical body in the longitudinal direction and through which the purified air that has passed through the hollows of the hollow fiber membranes is discharged.

3. The gas separation membrane module according to claim 2, wherein
when the gas separation membrane module is driven, (i) a third gas pressure difference between a gas pressure of the first supply chamber and a gas pressure of each of the feed gas introduction ports is less than (ii) a fourth gas pressure difference between the gas pressure of each of the feed gas introduction ports and a gas pressure of each of the purified air discharge ports.

4. The gas separation membrane module according to claim 1, wherein
a ratio A2/A1, which is a ratio of a total cross-sectional area A2 to an internal cross-sectional area A1, is within a range of greater than or equal to 0.4, the internal cross-sectional area A1 being perpendicular to the longitudinal direction of the cylindrical body, and the total cross-sectional area A2 being perpendicular to the longitudinal direction of the hollow fiber membranes.

5. The gas separation membrane module according to claim 1, wherein
the sweep gas introduction ports and the mixed gas discharge ports are both arranged at regular intervals in the circumferential direction of the cylindrical body.

6. The gas separation membrane module according to claim 1, wherein
the casing includes:
a first inner wall that partitions off the first supply chamber and the second discharge chamber from each other in the longitudinal direction of the cylindrical body, and supports the hollow fiber membrane element;
a second inner wall that partitions off the second discharge chamber and the second supply chamber from each other in the longitudinal direction of the cylindrical body, and supports the hollow fiber membrane element; and
a third inner wall that partitions off the second supply chamber and the first discharge chamber from each other in the longitudinal direction of the cylindrical body, and supports the hollow fiber membrane element, and
the casing accommodates the entire hollow fiber membrane element.

7. The gas separation membrane module according to claim 1, wherein
a volume of one of, or each of, the second supply chamber and the second discharge chamber is set to a value that is 1.0 times or more as great as a volume of the hollow fiber membrane element.

8. The gas separation membrane module according to claim 1, wherein
an internal diameter of each hollow fiber membrane is set to a value within a range of greater than or equal to 500 μm and less than or equal to 5000 μm,
an external diameter of each hollow fiber membrane is set to a value within a range of greater than or equal to 700 μm and less than or equal to 5200 μm, and
a membrane thickness of each hollow fiber membrane is set to a value within a range of greater than or equal to 30 μm and less than or equal to 500 μm.

9. The gas separation membrane module according to claim 1, wherein
the at least one hollow fiber membrane element comprises a plurality of hollow fiber membrane elements, and
the plurality of hollow fiber membrane elements are arranged side by side and mounted to the same casing.

10. The gas separation membrane module according to claim 1, wherein
the hollow fiber membrane element is detachably mounted to the casing.

11. A method of operating a gas separation membrane module,
the module comprising:
at least one hollow fiber membrane element including hollow fiber membranes and a cylindrical body, the hollow fiber membranes being arranged side by side, each hollow fiber membrane including a hollow through which feed gas flows, the cylindrical body extending in a longitudinal direction of the hollow fiber membranes and accommodating the hollow fiber membranes; and
a casing that covers at least part of the cylindrical body in an air-tight manner, wherein
the hollow fiber membrane element includes:
sweep gas introduction ports positioned on an outer periphery of the cylindrical body at one end side of the cylindrical body in a longitudinal direction of the cylindrical body, the sweep gas introduction ports being arranged dispersedly in a circumferential direction of the cylindrical body, the sweep gas introduction ports being introduction ports through which sweep gas having a lower carbon dioxide concentration and a higher oxygen concentration than the feed gas is introduced into an internal space of the cylindrical body, such that the sweep gas comes into contact with the hollow fiber membranes in the internal space; and
mixed gas discharge ports positioned on the outer periphery of the cylindrical body at another end side of the cylindrical body in the longitudinal direction of the cylindrical body, the mixed gas discharge ports being arranged dispersedly in the circumferential direction of the cylindrical body, the mixed gas discharge ports being discharge ports through which mixed gas is discharged from the internal space, the mixed gas being generated as a result of the sweep gas coming into contact with the feed gas via the hollow fiber membranes in the internal space,
the casing includes a casing-side introduction port through which the sweep gas is introduced into the casing, the casing-side introduction port being located on a peripheral surface of the casing such that the casing-side introduction port overlaps one of the sweep gas introduction ports in a radial direction of the cylindrical body, a first supply chamber, a first discharge chamber, a second supply chamber, and a second discharge chamber are positioned between the casing and the hollow fiber membrane element, the first supply chamber communicates with each of the hollow fiber membranes and is filled with the feed gas that is supplied from outside, the first discharge chamber communicates with each of the hollow fiber membranes and is filled with purified air that is generated as a result of the feed gas coming into contact with the sweep gas in the hollows of the hollow fiber membranes via the hollow fiber membranes, the second supply chamber extends continuously in the circumferential direction of the cylindrical body, communicates with each of the sweep gas introduction ports, and is filled with the sweep gas that is supplied from outside through the casing-side introduction port, the second discharge chamber extends continuously in the circumferential direction of the cylindrical body, communicates with each of the mixed gas discharge ports, and is filled with the mixed gas that has passed through the internal space, and the first supply chamber, the first discharge chamber, the second supply chamber, and the second discharge chamber are partitioned off from each other; and the method comprising driving the gas separation membrane module so that (i) a first gas pressure difference between a gas pressure of the second supply chamber and a gas pressure of each of the sweep gas introduction ports is less than (ii) a second gas pressure difference between the gas pressure of each of the sweep gas introduction ports and a gas pressure of each of the mixed gas discharge ports.

* * * * *